United States Patent
Deng et al.

(10) Patent No.: US 10,884,420 B2
(45) Date of Patent: Jan. 5, 2021

(54) CLEANING ROBOT AND SHORTEST PATH PLANNING METHOD BASED ON CLEANING ROBOT

(71) Applicant: SHENZHEN SILVER STAR INTELLIGENT TECHNOLOGY CO., LTD., Guangdong (CN)

(72) Inventors: Xuyi Deng, Guangdong (CN); Yuxi Liu, Guangdong (CN)

(73) Assignee: SHENZHEN SILVER STAR INTELLIGENT TECHNOLOGY CO., LTD., Shenzhen (CN)

(*) Notice: Subject to any disclaimer, the term of this patent is extended or adjusted under 35 U.S.C. 154(b) by 169 days.

(21) Appl. No.: 16/217,071

(22) Filed: Dec. 12, 2018

(65) Prior Publication Data
US 2019/0179325 A1     Jun. 13, 2019

(30) Foreign Application Priority Data
Dec. 12, 2017    (CN) .......................... 2017 1 1322005

(51) Int. Cl.
*G05D 1/02*      (2020.01)
*G06F 16/901*    (2019.01)
(Continued)

(52) U.S. Cl.
CPC .......... *G05D 1/0217* (2013.01); *A47L 9/2852* (2013.01); *A47L 11/4011* (2013.01);
(Continued)

(58) Field of Classification Search
CPC ............... A47L 2201/04; A47L 9/2852; A47L 11/4011; G05D 1/0217; G05D 1/0219;
(Continued)

(56) References Cited

U.S. PATENT DOCUMENTS

| | | | | |
|---|---|---|---|---|
| 7,418,382 | B1* | 8/2008 | Maes ..................... | H04M 3/493 704/236 |
| 9,037,396 | B2* | 5/2015 | Pack ...................... | G01C 21/30 701/409 |

(Continued)

FOREIGN PATENT DOCUMENTS

| | | |
|---|---|---|
| CN | 103941737 A | 7/2014 |
| CN | 104615138 A | 5/2015 |

(Continued)

OTHER PUBLICATIONS

Notification to Grant Patent Right for Invention of Counterpart Chinese Patent Application No. 201711322005.6 dated Nov. 27, 2019.
(Continued)

*Primary Examiner* — Dale W Hilgendorf
*Assistant Examiner* — Alexander C. Bost

(57) ABSTRACT

A cleaning robot and a shortest path planning method based on a cleaning robot are disclosed, a plurality of cleaning lines are formed by controlling the cleaning robot to perform cleaning in an area according to a zigzag-shaped path; association information of midpoints of at least a part of the cleaning lines is recorded to form a node skeleton tree in which midpoints are represented by nodes, the association information of each midpoint includes: position information of a node corresponding to the midpoint, position information of a parent node, and information of the number of child nodes of the parent node; in the process of traversing upwardly from a current node or traversing upwardly from both a current node and a target node in the node skeleton tree, the node skeleton tree is compressed, so as to determine the shortest planned path from the current node to the target node.

17 Claims, 6 Drawing Sheets

(51) Int. Cl.
    *B25J 9/16*     (2006.01)
    *G01C 21/20*     (2006.01)
    *A47L 9/28*     (2006.01)
    *A47L 11/40*     (2006.01)

(52) U.S. Cl.
    CPC ............ *B25J 9/1664* (2013.01); *G01C 21/20* (2013.01); *G05D 1/0219* (2013.01); *G05D 1/0274* (2013.01); *G06F 16/9027* (2019.01); *A47L 2201/04* (2013.01); *G05D 2201/0203* (2013.01); *G05D 2201/0215* (2013.01)

(58) Field of Classification Search
    CPC ......... G05D 1/0274; G05D 2201/0203; G05D 2201/0215; G01C 21/20; G01C 21/206; G06F 16/9027; B25J 9/1664
    See application file for complete search history.

(56) References Cited

U.S. PATENT DOCUMENTS

| | | | | |
|---|---|---|---|---|
| 9,687,132 B2* | 6/2017 | Schlischka | ........... | A47L 11/4061 |
| 10,045,675 B2* | 8/2018 | Haegermarck | ...... | A47L 11/4038 |
| 10,345,821 B2* | 7/2019 | Horst | ................... | G05D 1/0274 |
| 10,373,389 B2* | 8/2019 | Jung | ................... | G06T 19/006 |
| 10,499,782 B2* | 12/2019 | Jung | ................... | A47L 9/2857 |
| 10,646,086 B2* | 5/2020 | Ryu | ..................... | G05D 1/0225 |
| 10,694,910 B2* | 6/2020 | Kuhara | ................... | A47L 5/22 |
| 2014/0016469 A1* | 1/2014 | Ho | ........................ | H04L 1/0076 370/235 |
| 2014/0283326 A1* | 9/2014 | Song | ................... | A47L 11/4044 15/319 |
| 2015/0005937 A1* | 1/2015 | Ponulak | ................. | G06N 3/049 700/253 |
| 2015/0185322 A1* | 7/2015 | Haegermarck | ......... | G01S 17/46 700/259 |
| 2015/0197012 A1* | 7/2015 | Schnittman | ............ | G05D 1/027 700/250 |
| 2016/0154408 A1* | 6/2016 | Eade | .................... | G05D 1/0253 701/523 |
| 2017/0057087 A1 | 3/2017 | Lee | | |
| 2017/0131721 A1* | 5/2017 | Kwak | .................... | B25J 9/1664 |
| 2017/0273527 A1 | 9/2017 | Han et al. | | |
| 2017/0344013 A1* | 11/2017 | Haegermarck | ........ | G05D 1/0238 |
| 2018/0039662 A1* | 2/2018 | Asai | .................... | G06F 16/9027 |
| 2018/0103812 A1* | 4/2018 | Lee | ........................ | A47L 9/2852 |
| 2019/0004537 A1* | 1/2019 | Haegermarck | ........ | G05D 1/0274 |
| 2019/0035096 A1* | 1/2019 | Huang | ................. | G05D 1/0246 |

FOREIGN PATENT DOCUMENTS

| | | |
|---|---|---|
| CN | 105955280 A | 9/2016 |
| CN | 106979785 A | 7/2017 |
| CN | 107000207 A | 8/2017 |
| CN | 107003669 A | 8/2017 |

OTHER PUBLICATIONS

Second Office Action of Counterpart Chinese Patent Application No. 201711322005.6 dated Sep. 29, 2019.
First search of Counterpart Chinese Patent Application No. 201711322005.6.
Xuelong Dai et al., Research on Level Compression Trie Algorithm for Packet Classification, Mini- Micro Systems, Jun. 2006, pp. 1023-1028, vol. 127, No. 6.

* cited by examiner

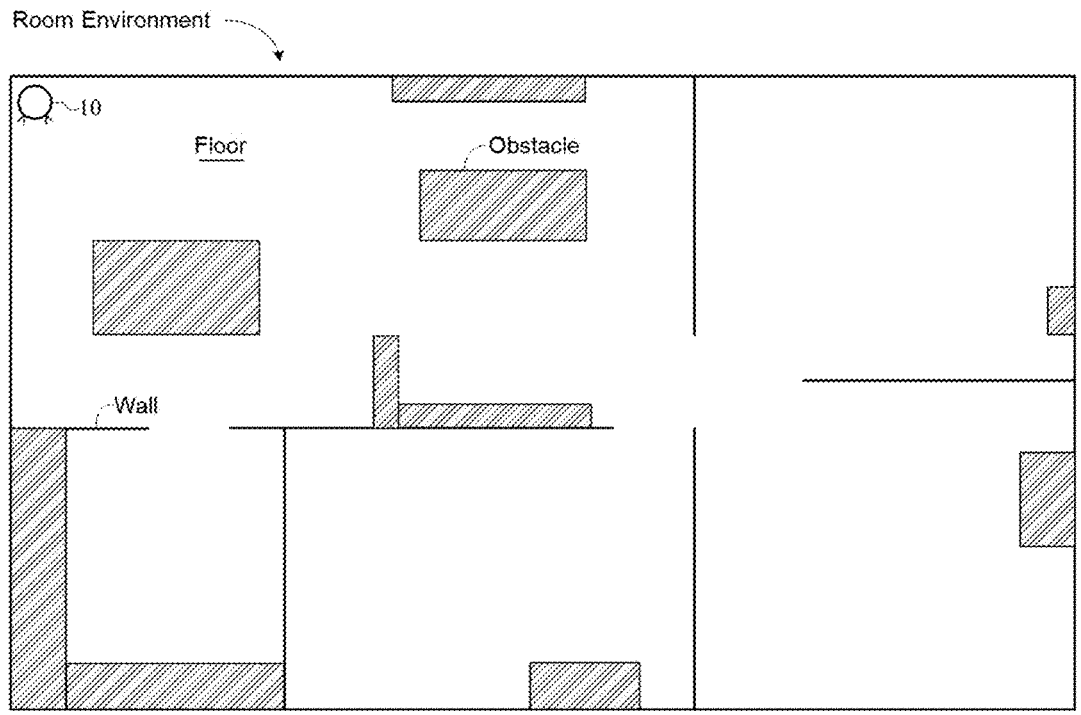

FIG. 3

| Controlling the cleaning robot to perform cleaning in an area according to a zigzag-shaped path, to form a plurality of cleaning lines | — S51 |

| Recording association information of midpoints of at least some of the cleaning lines to form a node skeleton tree in which midpoints are represented by nodes | — S52 |

| Compressing the node skeleton tree in the process of traversing upwardly from a current node in the node skeleton tree or in the process of traversing upwardly from both a current node and a target node in the node skeleton tree, so as to determine the shortest planned path from the current node to the target node | — S53 |

CLEANING ROBOT AND SHORTEST PATH PLANNING METHOD BASED ON CLEANING ROBOT

CROSS-REFERENCE TO RELATED APPLICATIONS

The present disclosure claims the priority to the Chinese patent application with the filing No. CN201711322005.6, filed on Dec. 12, 2017 with the China National Intellectual Property Administration (CNIPA) of the People's Republic of China, entitled "Cleaning Robot and Shortest Path Planning Method Based on Cleaning Robot", which is incorporated herein by reference in its entirety.

TECHNICAL FIELD

The present disclosure relates to the technical field of cleaning robots, and particularly to a cleaning robot and a shortest path planning method (a method for planning a shortest path) based on a cleaning robot.

BACKGROUND ART

With the improvement of people's living standard and the acceleration of the pace of life, more and more middle-class people hope to free themselves from the drudgery of indoor cleaning, and choose to purchase cleaning robots to help them settle matter of indoor daily cleaning. The cleaning efficiency and the coverage rate of cleaning of the cleaning robot are the core focus of the consumers' concern, and the coverage rate of cleaning largely determines the cleaning effect.

At present, the cleaning robots on the market are roughly classified into random cleaning type and path planning type. For the random cleaning type robots, since there is no internal map established therein, the quality of their cleaning paths depends on the quality of a random planning algorithm. A majority of robots of the random cleaning type have a relatively low coverage rate of cleaning and an excessively high rate of cleaning repetition, thus bringing an unsatisfactory experience to users. The robots of path planning type partially employ an SLAM (Simultaneous Localization and Mapping) solution, and can measure the environment to be cleaned and can carry out an optimal path planning in the case where the general environment is already known; and partially employ an inertial navigation solution, and can traverse an unknown environment with a single cleaning rule by means of techniques such as gyroscopes, odometers and perform obstacle avoidance, supplementary cleaning, path planning, etc. according to a map obtained by exploration.

In a process of cleaning by blocks, traversing an unknown environment with a single cleaning rule will result in many missed places, which requires an operation of supplementary cleaning, and in the process of looking for the way back to a charging station, path planning is also required. The path planning algorithms involved typically include Dijkstra algorithm, A-Star algorithm, etc., wherein the Dijkstra algorithm has a relatively high time complexity of algorithm; and for the A-Star algorithm, two lists, i.e., OpenList and CloseList, are created, which are used for recording to-be-explored nodes and explored nodes, respectively. Since in the traditional A-Star algorithm, nodes are gradually expanded according to the neighborhood nodes of a currently explored node and added to the OpenList, it is necessary to maintain a huge OpenList and perform numerous query operations, which not only consumes much storage space, but also consumes considerable operation time.

SUMMARY

The present disclosure aims to solve the technical problems of relatively high time complexity of algorithm, relatively large storage space consumption, excessive time consumption, etc., at the time of performing shortest path planning for a cleaning robot, and provides a cleaning robot and a shortest path planning method based on a cleaning robot.

In order to solve the above technical problems, with the cleaning robot and the shortest path planning method based on the cleaning robot provided by embodiments of the present disclosure, a plurality of cleaning lines are formed by controlling the cleaning robot to perform cleaning in an area (cleaning by areas) according to a zigzag-shaped path; association information of midpoints of at least some of the cleaning lines is recorded to form a node skeleton tree in which midpoints are represented by nodes, wherein the association information of each midpoint includes: position information of a node corresponding to the midpoint, position information of a parent node, and information of the number of child nodes of the parent node; in the process of traversing upwardly from a current node in the node skeleton tree or in the process of traversing upwardly from both a current node and a target node in the node skeleton tree, the node skeleton tree is compressed, so as to determine the shortest planned path from the current node to the target node, which has a low time complexity of algorithm, occupies small storage space and consumes less operation time.

BRIEF DESCRIPTION OF DRAWINGS

In order to more clearly illustrate the technical solutions of the examples of the present disclosure or in the prior art, brief description is made below on the drawings required to be used in the description of the examples or the prior art. Obviously, the drawings in the following description only illustrate some of the examples of the present disclosure, and for those of ordinary skills in the art, other variations may be obtained from these drawings without inventive efforts.

FIG. 3 is a top view of a room environment;

FIG. 4 is a flowchart of steps of a shortest path planning method based on a cleaning robot according to an embodiment of the present disclosure;

DETAILED DESCRIPTION OF EMBODIMENTS

The technical solutions in examples of the present disclosure are clearly described below with reference to the drawings in examples of the present disclosure. Apparently, the described examples are merely some of the embodiments of the present disclosure, rather than all the examples. Based on the examples in the present disclosure, all the other examples obtained by those of ordinary skills in the art without inventive efforts shall be covered by the protection scope of the present disclosure.

Figure 1:
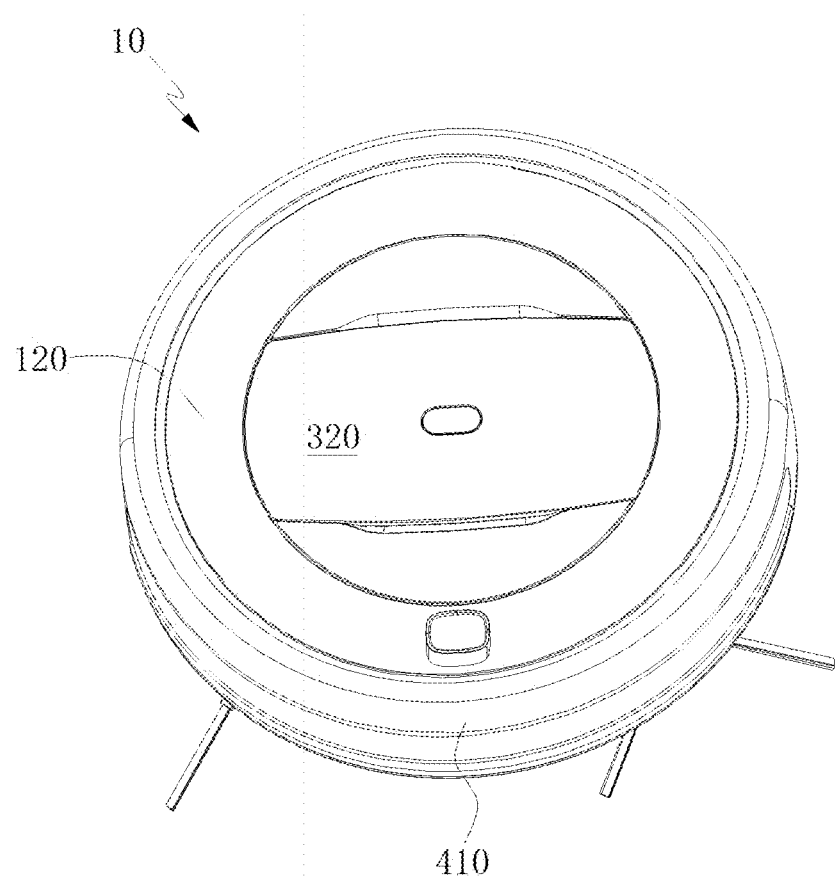
FIG. 1 is a schematic structural diagram of a cleaning robot according to an embodiment of the present disclosure.
Figure 2:
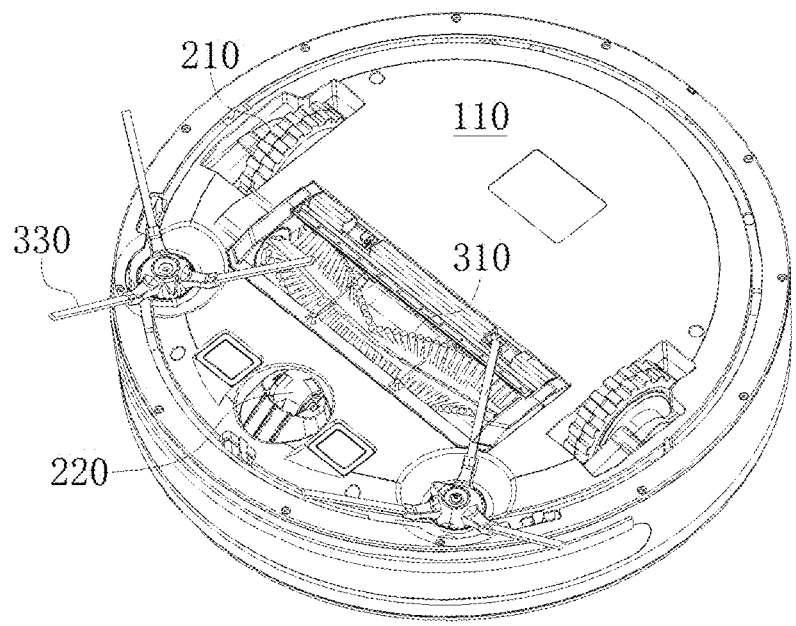
FIG. 2 is a schematic diagram of the bottom structure of the cleaning robot in FIG. 1.

FIG. 1 is a schematic structural diagram of a cleaning robot according to an embodiment of the present disclosure, and FIG. 2 is a schematic diagram of the bottom structure of the cleaning robot shown in FIG. 1.

Referring to FIG. 1 and FIG. 2, in embodiments of the present disclosure, description is made taking the case as an example where a cleaning robot 10 is a sweeping robot. In other optional embodiments, the cleaning robot 10 may also be a robot mop, a robot vacuum, etc.

The cleaning robot 10 comprises a body, wherein the body may comprise a chassis 110 and an upper cover 120, the upper cover 120 is detachably mounted on the chassis 110 to protect various functional components inside the cleaning robot 10 from violent collisions or damages by accidentally dripping liquid during use; and the chassis 110 and/or the upper cover 120 are/is configured to carry and support various functional components. In an optional embodiment, the body of the cleaning robot 10 may also be other designs or configurations, for example, the body is an integrally formed structure, or a left-right split structure. The material, shape, structure, etc. of the body are not limited in the embodiments of the present disclosure.

The cleaning robot 10 comprises a drive system connected with the body and configured to drive the cleaning robot 10 to move on the floor, for example, the cleaning robot 10 may be designed to autonomously plan a path on the floor, or may be designed to move on the floor in response to remote control instructions. In an embodiment of the present disclosure, the drive system comprises two wheels 210, at least one universal wheel 220, and a motor for driving the wheels 210 to rotate, the wheels 210 and the universal wheel 220 at least partially protrude from the bottom of the chassis 110, for example, under the action of the weight of the cleaning robot 10 itself, the two wheels 210 can be partially hidden within the chassis 110. In an optional embodiment, the drive system may further comprise any one of a triangular track wheel, a Mecanum wheel, etc.

The cleaning robot 10 may further comprise a sweeping system, for example, the sweeping system comprises one or both of a middle sweeping brush 310 and a middle sweeping rubber brush, the middle sweeping brush 310 and the middle sweeping rubber brush are adapted to be disposed in a receiving groove provided to open at the bottom of the chassis 110. A dust suction opening is provided in the receiving groove, and the dust suction opening communicates with a dust collection box 320 and a dust suction fan, so that when the middle sweeping brush 310 rotates, dust and rubbish on the floor are stirred up, and then are sucked into the dust collection box 320 through the dust suction opening by a suction force generated by the dust suction fan. In addition to the middle sweeping brush 310 and/or the middle sweeping rubber brush, the cleaning robot 10 may further comprise side brushes 330, and the cleaning coverage area of each of the side brushes 330 extends beyond the range of the outer contour of the body, which is beneficial to effective cleaning of wall edges, corners and obstacle edges.

The cleaning robot 10 may further comprise a mopping system, for example, the mopping system comprises a water storage tank, a rag, etc., and the water storage tank and the dust collection box 320 may be separately disposed, or may be integrally designed. In an optional embodiment, water in the water storage tank is pumped out by a water pump and drips evenly onto the rag, and when the cleaning robot 10 moves on the floor, the wetted rag wipes the floor. In an optional embodiment, water in the water storage tank is atomized by an atomizer to form water mist which is then sprayed onto the floor, and then the rag wipes the floor onto which water mist has been sprayed.

The cleaning robot 10 may further comprise a collision sensing device, wherein the collision sensing device is formed on at least a part of an outer periphery of the body. In an embodiment of the present disclosure, the collision sensing device comprises a collision portion 410 surrounding the outer periphery of the body, and a sensor and an elastic mechanism which are disposed between the body and the collision portion 410. The arrangement of an elastic mechanism and a sensor between the collision portion 410 and the body includes, but is not limited to, the following cases: 1) the elastic mechanism and the sensor are located between the collision portion 410 and the body; 2) the elastic mechanism and/or the sensor are/is mounted on the body, but a portion of the elastic mechanism and/or the sensor is located between the collision portion 410 and the body; 3) the elastic mechanism and/or the sensor are mounted on the collision portion 410, but a portion of the elastic mechanism and/or the sensor is located between the collision portion 410 and the body; and 4) the elastic mechanism and/or the sensor are mounted on the collision portion 410 and the body. The elastic mechanism is configured to maintain a uniform gap for movement between the collision portion 410 and the body, and the sensor is configured to sense relative displacement between the collision portion 410 and the body. The sensor may be any one or more of a microswitch, a Hall switch, an infrared photoelectric switch, etc. A plurality of sensors may be provided between the body and the collision portion 410, for example, at least one sensor is disposed between the collision portion 410 and the front of the body of the cleaning robot 10 as well as between the collision portion 410 and two sides of the body of the cleaning robot 10, respectively. The sensors are typically electrically connected with a certain controller, processor or control system (not shown in figures) of the cleaning robot 10 to facilitate acquiring data of the sensor so as to control the cleaning robot 10 to perform corresponding operations. Since the collision portion 410 surrounds the body, no matter which portion of the collision portion 410 collides with an obstacle during walking of the cleaning robot 10, relative displacement will occur between the collision portion 410 and the body. Since the sensor may sense the relative displacement between the collision portion 410 and the body, the cleaning robot 10 may sense a collision with an obstacle, the cleaning robot 10 can change the direction of movement to avoid the obstacle with which collision occurs, or take other countermeasures.

In practical application, when cleaning the floor, the cleaning robot needs to move from a cleaned area to an uncleaned area, or perform supplementary cleaning on the missed places of the floor. Since the battery level of the battery carried by the cleaning robot is limited, when the battery level (electric quantity) of the battery is lower than a certain threshold, the intelligent cleaning robot can autonomously look for the charging station to dock with the charging station so as to be charged. Path planning is always required, whether in the process of moving from a cleaned area to an uncleaned area, in the process of performing supplementary cleaning on the missed places of the floor, or in the process of looking for the charging station, so that the target position is reached with a relatively small moving distance. An embodiment of the present disclosure provides a shortest path planning method based on a cleaning robot, which is described below taking the case as an example where the cleaning robot 10 performs mobile cleaning on the floor in the top view of the room environment shown in FIG. 3. The room environment is partitioned into a plurality of rooms by walls, and obstacle such as furniture and household appliances are placed on the floor. For ease of distinction, the obstacles such as furniture and household appliances are represented by blocks filled with oblique lines. It will be readily understood that the objects such as walls, furniture and household appliances that can block the movement of the cleaning robot all can be regarded as obstacles.

As shown in FIG. 4, a shortest path planning method based on a cleaning robot provided by an embodiment of the present disclosure comprises step S51, step S52 and step S53.

Step S51 comprises: controlling the cleaning robot to perform cleaning in an area according to a zigzag-shaped path, to form a plurality of cleaning lines.

Figure 5:
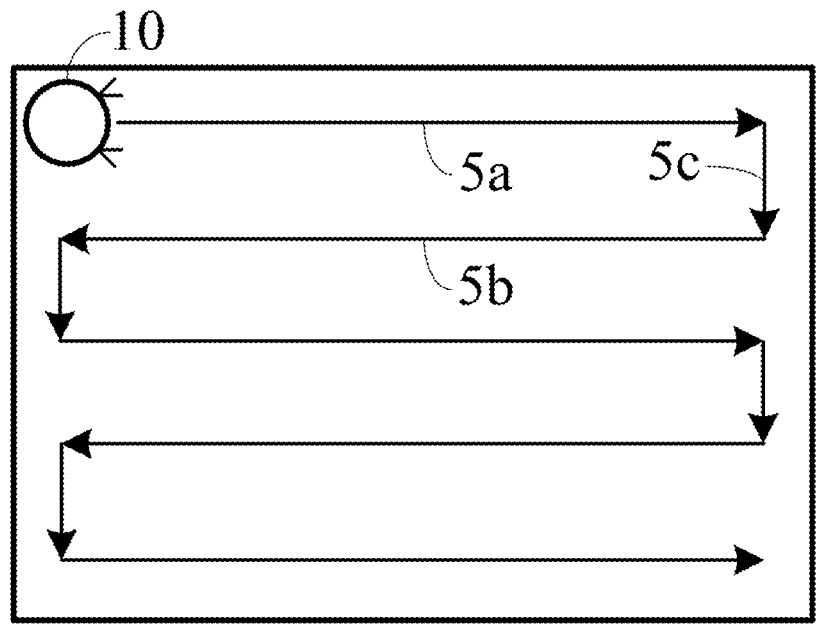
FIG. 5 is a schematic diagram of a zigzag-shaped path.

FIG. 5 is a schematic diagram of the zigzag-shaped path. In the zigzag-shaped path, the cleaning robot 10 changes direction when encountering an obstacle such as wall, furniture and household appliance. The zigzag-shaped path includes long cleaning lines and short direction-changing lines connected with two adjacent long cleaning lines having opposite directions, for example, two adjacent long cleaning lines 5a and 5b having opposite directions, and a short direction-changing lines 5c connected with the long cleaning lines 5a and 5b, as denoted in FIG. 5. The cleaning lines mentioned in the embodiments of the present disclosure refer to long cleaning lines. When the cleaning robot 10 performs cleaning in an area along a zigzag-shaped path, cleaning may be performed by dividing the cleaning area into sub-areas, e.g., sub-areas having a size of 4 m*4 m, and when performing cleaning along a zigzag-shaped path within a sub-area of such size, the cleaning robot 10 changes direction as long as it reaches a boundary of the sub-area, if no obstacle is encountered. It is to be noted that the size of each of the sub-areas may be set by the user according to needs, or may be preset by the manufacturer of the cleaning robot 10; and it is also feasible that the cleaning area is not divided into sub-areas when the cleaning robot 10 performs cleaning in an area along a zigzag-shaped path, for example, when performing cleaning along a zigzag-shaped path, the cleaning robot 10 does not change direction until it encounters the obstacles such as walls, furniture and household appliances.

In an embodiment of the present disclosure, description is made by taking the case as an example where the cleaning robot 10 performs cleaning in an area on the floor in the room environment shown in FIG. 3 along a zigzag-shaped path. For the sake of brevity, in the zigzag-shaped path shown in FIG. 6, the short direction-changing lines are omitted, thereby forming a plurality of cleaning lines denoted by straight line arrows.

Step S52 comprises: recording association information of midpoints of at least a part of the cleaning lines to form a node skeleton tree in which midpoints are represented by nodes, wherein the association information of each midpoint includes: position information of a node corresponding to the midpoint, position information of a parent node of the node, and information of the number of child nodes of the parent node of the node.

Figure 7:
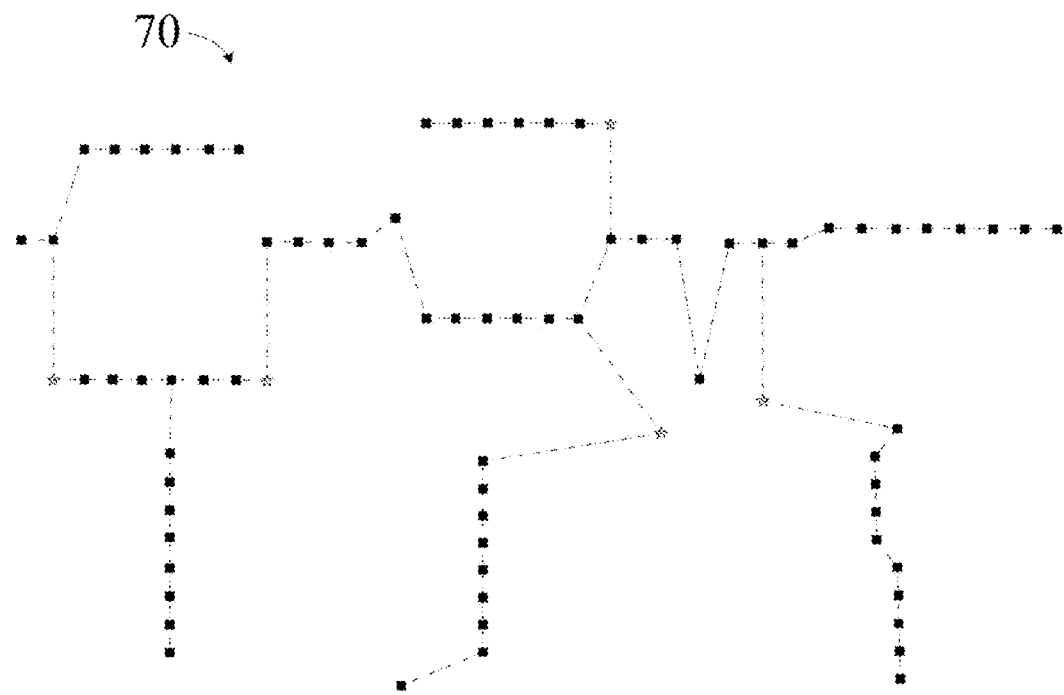
FIG. 7 is a schematic diagram of a node skeleton tree formed by recording association information of midpoints of at least a part of the cleaning lines.

In an embodiment of the present disclosure, the cleaning robot 10 may comprise sensors such as an inertial measurement unit and an encoding disk, to realize measurement of the length of a cleaning line, so as to determine midpoints of at least a part of the cleaning lines and record association information of each of the midpoints. A node skeleton tree (referring to the node skeleton tree 70 shown in FIG. 7) is formed by representing midpoints with nodes, each two adjacent nodes in the node skeleton tree is provided with a parent-child node relation, and at the time of performing traversing, it is possible to perform traversing upwardly from child nodes to parent nodes.

When performing cleaning in an area along a zigzag-shaped path, the cleaning robot 10 may establish a navigation map and update the navigation map continuously. The navigation map may include information of the node skeleton tree. The navigation map may be a navigation map established using the sensors such as an inertial measurement unit and an encoding disk. It is also feasible to establish a navigation map by means of external environment detection sensors such as a floor detection sensor (e.g., infrared transmitting and receiving tubes mounted on the chassis 110 of the cleaning robot 10), a wall detection sensor (e.g., infrared transmitting and receiving tubes mounted on side portions of the cleaning robot 10), a laser distance measuring sensor, etc. simultaneously. In practical application, cumulative errors of the inertial measurement unit may exist, and measurement errors of the encoding disk caused by slipping of the wheels 210 of the cleaning robot 10 may also exist. If it is necessary to correct the navigation map, the node skeleton tree is corrected correspondingly.

In order to prevent the formation of a loopback path in the node skeleton tree, the association information of the midpoints of the cleaning lines formed when the cleaning robot 10 repeatedly cleans the cleaned area is no longer recorded. In order to ensure that each two adjacent nodes in the node skeleton tree are provided with the parent-child node relation, traversing is performed from any current node in the node skeleton tree to any other target node, and the node skeleton tree has only one root node.

Figure 6:
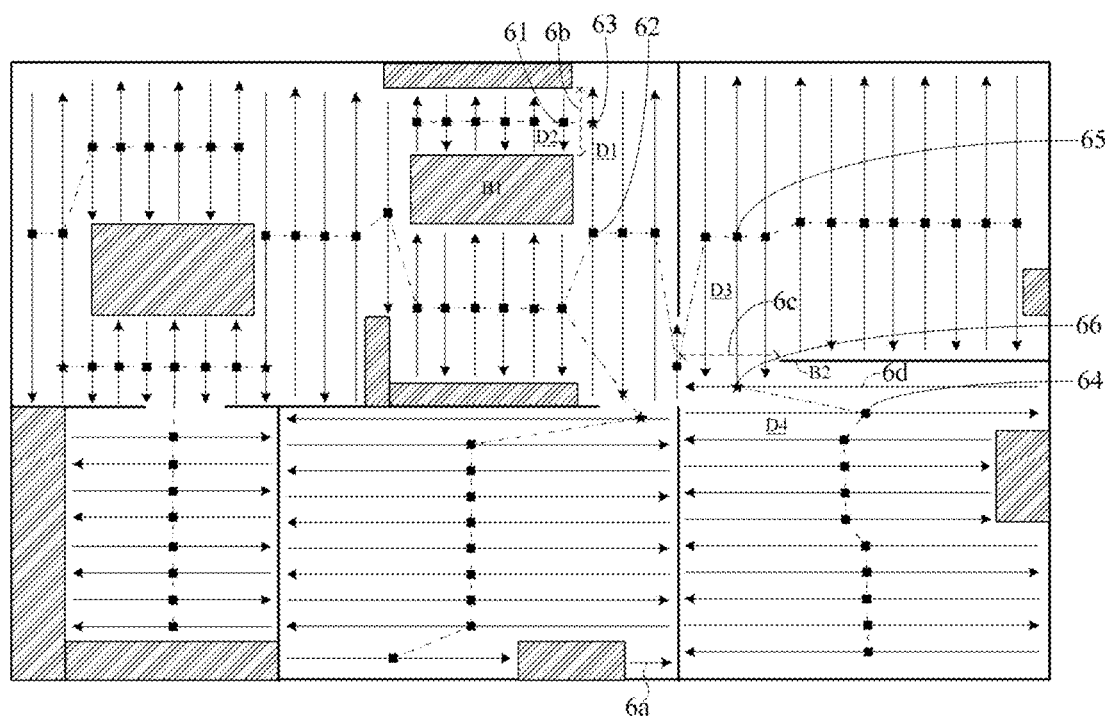
FIG. 6 is a schematic diagram illustrating the formation of a plurality of cleaning lines when a cleaning robot performs cleaning in an area along a zigzag-shaped path in the room environment shown in FIG. 3.

In an embodiment of the present disclosure, the association information of the midpoints of the cleaning lines whose length is smaller than a preset threshold may not be recorded, which cleaning lines are located in an area with an excessively high degree of closure. Referring to FIG. 6 illustrating a cleaning line 6a, the cleaning line 6a is located in an area with an excessively high degree of closure and has a length smaller than the preset threshold. The area with an excessively high degree of closure may be defined as an area where the cleaning robot 10 is blocked by obstacles in three directions of the four directions, and the area with an excessively high degree of closure may also be defined as a narrow and complicated area covered by a stool, a small table, etc. The preset threshold may be twice the body width of the cleaning robot 10, which is the body width in the front-rear direction of the cleaning robot 10, or the body width in the left-right direction of the cleaning robot 10; and the preset threshold may also be two and half times of the body width of the cleaning robot 10. In an optional embodiment, the preset threshold may be set as other numerical values as needed.

Step S53 comprises: compressing the node skeleton tree in the process of traversing upwardly from a current node in the node skeleton tree or in the process of traversing upwardly from both a current node and a target node in the node skeleton tree, so as to determine the shortest planned path from the current node to the target node.

If the target node is the root node, it is only required that traversing is performed upwardly from the current node; and if the target node is a leaf node, it is required that traversing is performed upwardly from both the current node and the target node.

Figure 8:
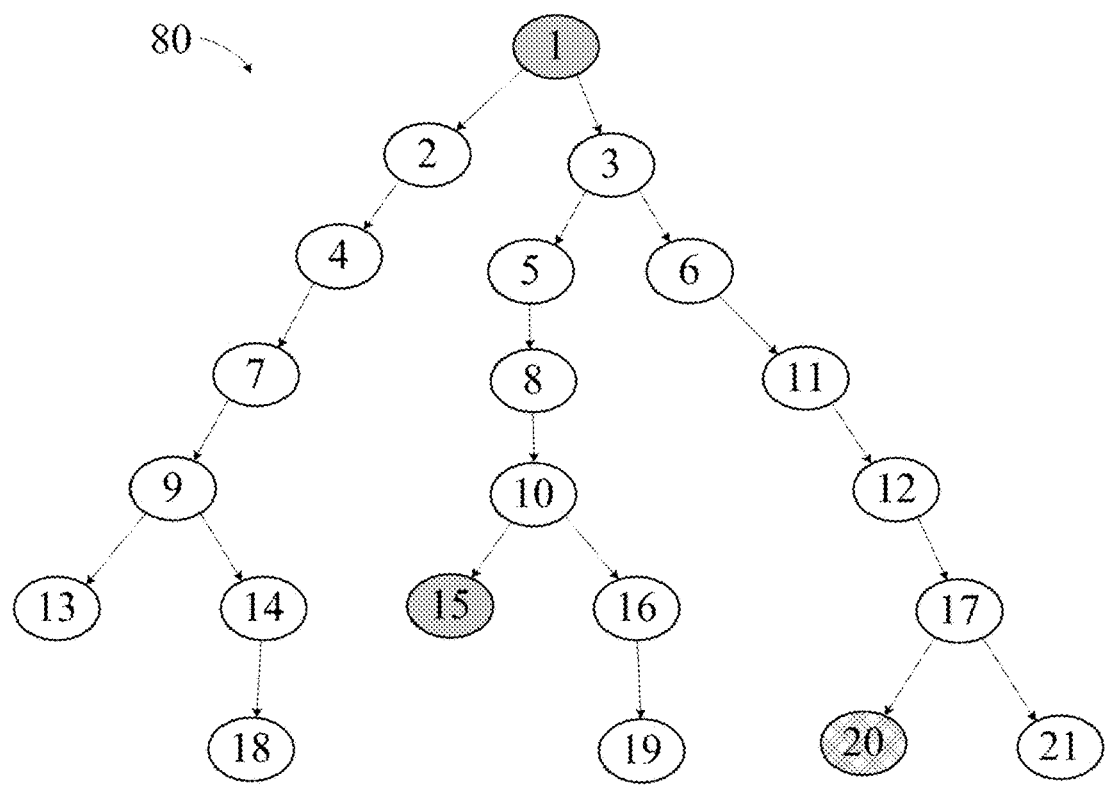
FIG. 8 is a schematic diagram of a node skeleton tree in which parent-child node relation is denoted by directions of arrows.

FIG. 8 shows a node skeleton tree 80 in which parent-child node relation is denoted by the direction of arrows. For ease of reference, the nodes in the node skeleton tree 80 are numbered.

Figure 9:
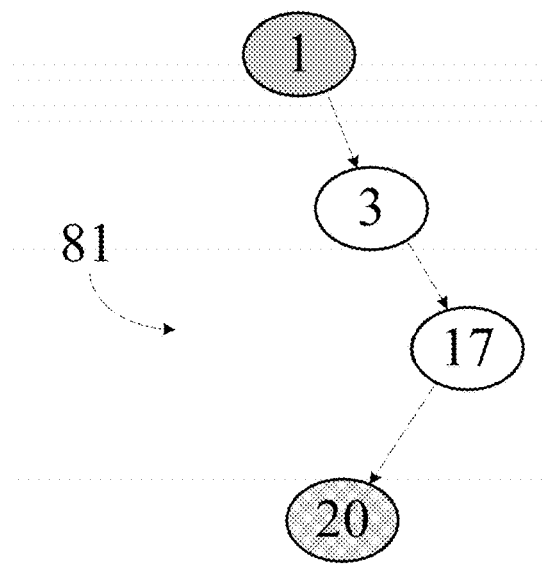
FIG. 9 is a schematic diagram of a node skeleton tree obtained by compressing the node skeleton tree in FIG. 8 once.
Figure 10:
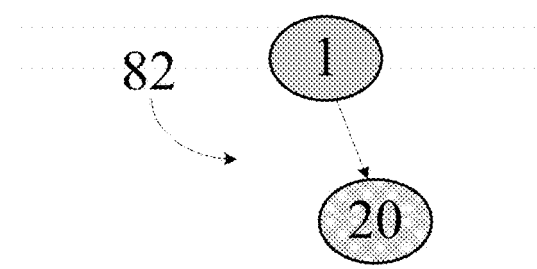
FIG. 10 is a schematic diagram of a node skeleton tree obtained by compressing the node skeleton tree in FIG. 9 once.

In an embodiment of the present disclosure, if the target node 1 is a root node, in the process of traversing upwardly from the current node 20, the parent nodes having at least two child nodes are retained, and the parent nodes having one child node are removed by compression. In FIG. 8, the parent node 17 and the parent node 3 each have two child nodes, and the parent node 6, the parent node 11 and the parent node 12 each have one child node; therefore, the parent node 17 and the parent node 3 are retained, and the parent node 6, the parent node 11 and the parent node 12 are removed by compression, forming a node skeleton tree 81 as shown in FIG. 9; traversing continues upwardly according to the traversal rule of retaining the parent nodes having at least two child nodes and removing, by compression, the parent nodes having one child node, until the target node 1 becomes the parent node of the current node 20, as shown in FIG. 10, thereby determining the shortest planned path from the current node 20 to the target node 1: current node 20→parent node 17→parent node 12→parent node 11→parent node 6→parent node 3→target node 1.

Figure 11:
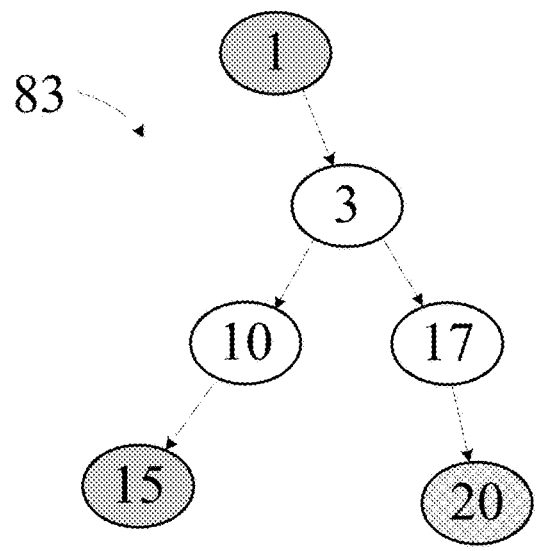
FIG. 11 is another schematic diagram of a node skeleton tree obtained by compressing the node skeleton tree in FIG. 8 once.
Figure 12:
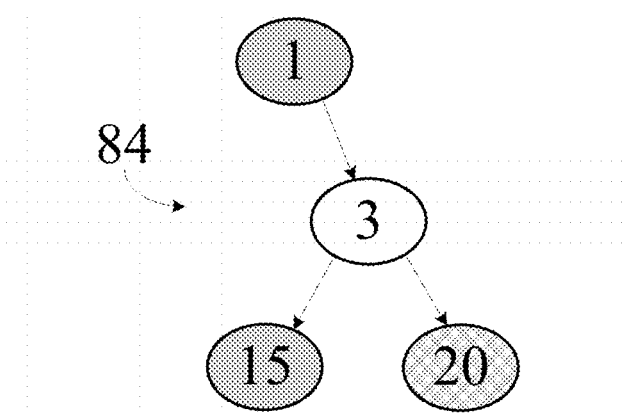
FIG. 12 is a schematic diagram of a node skeleton tree obtained by compressing the node skeleton tree in FIG. 11 once.

In another embodiment of the present disclosure, if the target node 15 is a leaf node, in the process of traversing upwardly from both the current node 20 and the target node 15, the parent nodes having at least two child nodes are retained, and the parent nodes having one child node are removed by compression. In FIG. 8, the parent node 17 and the parent node 10 each have two child nodes, the parent node 6, the parent node 11 and the parent node 12 each have one child node, and the parent node 5 and the parent node 8 each have one child node as well; therefore, the parent node 17 and the parent node 10 are retained, the parent node 6, the parent node 11 and the parent node 12 are removed by compression, and the parent node 5 and the parent node 8 are removed by compression, forming a node skeleton tree 83 as shown in FIG. 11; traversing continues upwardly according to the traversal rule of retaining the parent nodes having at least two child nodes and removing, by compression, the parent nodes having one child node, until the current node 20 and the target node 15 have the same parent node 3, as shown in FIG. 12, thereby determining the shortest planned path from the current node 20 to the target node 15: current node 20→parent node 17→parent node 12→parent node 11→parent node 6→parent node 3→parent node 5→parent node 8→parent node 10→target node 15.

Referring again to FIG. 6, if returning to the node 62 from the node 61 along a straight itinerary, the cleaning robot 10 may easily collide with the obstacle B1. Thus, in order to solve this problem, for example, when the cleaning robot 10 moves from the cleaned area D1 to the uncleaned area D2, the association information of the midpoint of the open boundary line 6*b* therebetween is recorded, that is, the association information of the midpoint 63 is recorded, preferably, the midpoint 63 may be mapped onto the cleaning line where the node 62 is located, thus, two nodes may be formed on one cleaning line to serve as the nodes of a node skeleton tree.

If returning to the node 65 from the node 64 along a straight line, the cleaning robot 10 will easily collide with the obstacle B2. Thus, in order to solve this problem, for example, when the cleaning robot 10 moves from the cleaned area D3 to the uncleaned area D4, the association information of the midpoint of the open boundary line 6*c* therebetween is recorded, that is, the association information of the midpoint 66 is recorded, preferably, the midpoint 66 may be mapped to the cleaning line 6*d* close to the open boundary line 6*c*, thus, one node which is not the midpoint of a cleaning line may be formed on the cleaning line to serve as a node of a node skeleton tree.

In the shortest path planning method based on a cleaning robot provided by the embodiments of the present disclosure, a plurality of cleaning lines are formed by controlling the cleaning robot to perform cleaning in an area according to a zigzag-shaped path; association information of midpoints of at least a part of the cleaning lines is recorded to form a node skeleton tree in which midpoints are represented by nodes, wherein the association information of each midpoint includes: position information of a nodes corresponding to the midpoints, position information of a parent node, and information of the number of child nodes of the parent node; in the process of traversing upwardly from a current node in the node skeleton tree or in the process of traversing upwardly from both a current node and a target node in the node skeleton tree, the node skeleton tree is compressed, so as to determine the shortest planned path from the current node to the target node, which has a low time complexity of algorithm, occupies small storage space and consumes less operation time.

Figure 13:
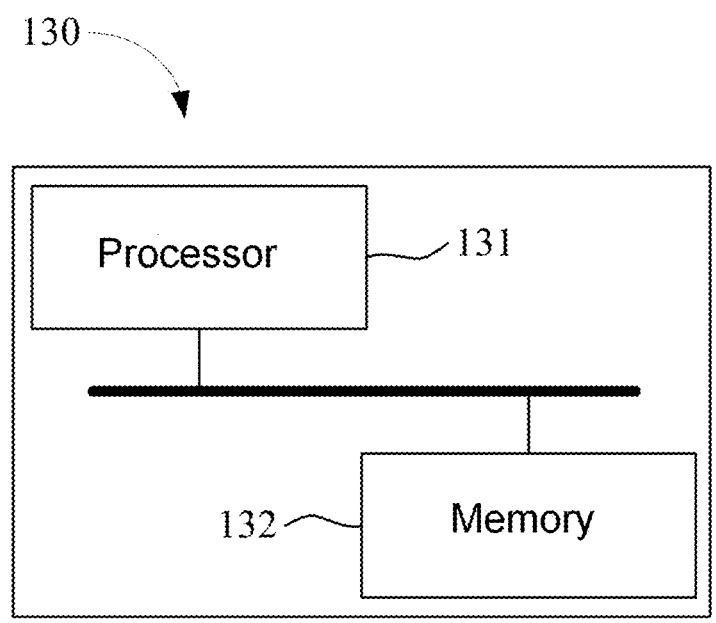
FIG. 13 is a schematic diagram of a hardware structure of a cleaning robot that executes a detection method based on a cleaning robot according to an embodiment of the present disclosure.

FIG. 13 is a schematic diagram of a hardware structure of a cleaning robot that executes the shortest path planning method in the embodiments described above according to an embodiment of the present disclosure. As shown in FIG. 13, the cleaning robot 130 comprises:

at least one processor 131; and a memory 132 in communication connection with the at least one processor, wherein the memory 132 stores instructions executable by the at least one processor 131, and the instructions are executed by the at least one processor 131 to cause the at least one processor 131 to execute the shortest path planning methods any one of the embodiments of method described above.

The processor 131 and the memory 132 may be connected by a bus or other means.

As a non-volatile computer readable storage medium, the memory 132 may be configured to store non-volatile software programs and non-volatile computer executable programs, e.g., program instructions corresponding to the shortest path planning method in the embodiments of the present disclosure. The processor 131 executes various functional applications and data processing of the cleaning robot 130 by running the non-volatile software programs and instructions which are stored in the memory 132, thereby implementing the shortest path planning method in the above-described embodiments of method.

The memory 132 may comprise a program storage area and a data storage area, wherein an application program required for at least one function and the operating system may be stored in the program storage area. In addition, the memory 132 may include high-speed random access memory, and may also include a non-volatile memory, e.g., at least one disk storage device, a flash memory device, or other non-volatile solid state storage device.

In the description of the specification of the present disclosure, the terms "one embodiment", "some embodiments", "an example", "a specific example", or "an alternative embodiment", etc., means that a particular feature, structure, material or characteristic described in connection with the embodiment or example is included in at least one embodiment or example of the present disclosure. In the specification of the present disclosure, the indicative representation of the above terms does not necessarily refer to the same embodiments or examples. Moreover, the description of the specific characteristic, structure, material, or feature can be combined in an appropriate manner in any one or more embodiments or examples.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

The invention claimed is:

1. A shortest path planning method based on a cleaning robot, comprising the following steps:
   controlling the cleaning robot to perform cleaning in an area according to a boustrophedon type path, to form a plurality of cleaning lines;
   recording association information of midpoints of at least a part of the cleaning lines to form a node skeleton tree in which the midpoints are represented by nodes, wherein the association information of each of the midpoints includes: position information of a node corresponding to the midpoint, position information of a parent node, and information of a number of child nodes of the parent node; and
   compressing the node skeleton tree in a process of traversing upwardly from a current node in the node skeleton tree or in a process of traversing upwardly from both the current node and a target node in the node skeleton tree, so as to determine a shortest planned path from the current node to the target node,
   wherein when the cleaning robot moves from a cleaned area to an uncleaned area, association information of a midpoint of an open boundary line between the cleaned area and the uncleaned area is recorded to serve as a node of the node skeleton tree.

2. The method according to claim 1, wherein the target node is a root node, and in the process of traversing upwardly from the current node, parent nodes having at least two child nodes are retained and parent nodes having one child node are removed by compression, until the target node becomes a parent node of the current node.

3. The method according to claim 1, wherein the target node is a leaf node, and in the process of traversing upwardly from both the current node and the target node, parent nodes having at least two child nodes are retained, and parent nodes having one child node are removed by compression, until the current node and the target node have a same parent node.

4. The method according to claim 1, wherein association information of midpoints of cleaning lines formed when the cleaning robot repeatedly cleans a cleaned area is not recorded, so as to prevent a loopback path from being formed in the node skeleton tree.

5. The method according to claim 1, wherein when the cleaning robot is controlled to perform cleaning in the area along the boustrophedon type path, a navigation map is established; and if the navigation map is corrected, the node skeleton tree is corrected correspondingly.

6. The method according to claim 1, wherein association information of midpoints of cleaning lines whose length is smaller than a preset threshold is not recorded, with the cleaning lines located in an area with an excessively high degree of closure.

7. The method according to claim 6, wherein the preset threshold is twice a body width of the cleaning robot.

8. The method according to claim 6, wherein the area with an excessively high degree of closure is an area where the cleaning robot is blocked by obstacles in three directions of four directions.

9. The method according to claim 1, wherein the node skeleton tree has only one root node.

10. A cleaning robot, comprising: at least one processor; and
    a memory in communication connection with the at least one processor,
    wherein the memory stores instructions executable by the at least one processor, and the instructions are executed by the at least one processor to cause the at least one processor to execute the method of claim 1.

11. The method according to claim 2, wherein association information of midpoints of cleaning lines formed when the cleaning robot repeatedly cleans a cleaned area is not recorded, so as to prevent a loopback path from being formed in the node skeleton tree.

12. The method according to claim 3, wherein association information of midpoints of cleaning lines formed when the cleaning robot repeatedly cleans a cleaned area is not recorded, so as to prevent a loopback path from being formed in the node skeleton tree.

13. The method according to claim 2, wherein when the cleaning robot is controlled to perform cleaning in the area along the boustrophedon type path, a navigation map is established; and if the navigation map is corrected, the node skeleton tree is corrected correspondingly.

14. The method according to claim 3, wherein when the cleaning robot is controlled to perform cleaning in the area along the boustrophedon type path, a navigation map is established; and if the navigation map is corrected, the node skeleton tree is corrected correspondingly.

15. The method according to claim 2, wherein association information of midpoints of cleaning lines whose length is smaller than a preset threshold is not recorded, with the cleaning lines located in an area with an excessively high degree of closure.

16. The method according to claim 3, wherein association information of midpoints of cleaning lines whose length is smaller than a preset threshold is not recorded, with the cleaning lines located in an area with an excessively high degree of closure.

17. The method according to claim 2, wherein the node skeleton tree has only one root node.

* * * * *